United States Patent [19]

Campbell et al.

[11] 3,755,297

[45] Aug. 28, 1973

[54] CONTINUOUS SECONDARY CELLULOSE ESTER PROCESS

[75] Inventors: Kenneth C. Campbell; James M. Davis; Gary E. Frye; Robert E. Woods, all of Rock Hill, S.C.

[73] Assignee: Celanese Corporation, New York, N.Y.

[22] Filed: June 30, 1971

[21] Appl. No.: 158,607

[52] U.S. Cl. ............... 260/227, 106/196, 106/198, 260/230 R
[51] Int. Cl. ............................................. C08b 3/06
[58] Field of Search ............... 260/227, 229, 230; 106/196, 198

[56] References Cited
UNITED STATES PATENTS

| | | | |
|---|---|---|---|
| 2,854,446 | 9/1958 | Robin et al. | 260/229 |
| 2,966,485 | 12/1960 | Laughlin et al. | 260/227 |
| 3,631,023 | 12/1971 | Horne et al. | 106/196 |
| 3,485,816 | 12/1969 | Crane et al. | 106/198 |
| 3,455,901 | 7/1969 | Crane | 260/230 |
| 2,432,341 | 12/1947 | Seymour et al. | 260/227 |
| 2,603,638 | 7/1952 | Seymour et al. | 260/229 |
| 2,607,771 | 8/1952 | Groombridge et al. | 260/227 |
| 2,772,944 | 12/1956 | Allewelt | 260/229 |
| 3,041,329 | 6/1962 | Campbell et al. | 260/227 |

*Primary Examiner*—Donald E. Czaja
*Assistant Examiner*—Ronald W. Griffin
*Attorney*—Thomas J. Morgan, Stephen D. Murphy et al.

[57] ABSTRACT

A continuous process for the preparation of a cellulose secondary acetate flake comprising the following steps:
1. slurrying cellulose in a lower fatty acid/water slurry;
2. washing said slurry with lower fatty acid and extracting water from the cellulose slurry;
3. adding an effective amount of an acid catalyst;
4. mixing the pretreated cellulose containing the lower fatty acid and catalyst with a lower fatty acid/lower fatty acid anhydride mixture containing excess anhydride and esterifying the cellulose mixture;
5. blending the esterified dope with an aqueous solution of neutralizing salt;
6. desulfating and hydrolysis of the acetylated dope;
7. adding an aqueous neutralizing salt to the hydrolyzed dope; and
8. flash cooling the dope.

4 Claims, No Drawings

CONTINUOUS SECONDARY CELLULOSE ESTER PROCESS

BACKGROUND OF THE INVENTION

This invention relates to the manufacture of cellulose esters and more particularly, to a continuous process for esterifying cellulose to produce a secondary cellulose ester.

The term "cellulose ester" is used herein to denote the lower alkyl esters of cellulose and especially esters of cellulose having between one and four carbon atoms in the ester moiety. The alkyl group in the ester chain may be acetate, a propionate, a butyrate, formate or mixtures thereof such as cellulose acetate formate, cellulose acetate propionate or cellulose acetate butyrate.

Cellulose esters are produced commercially almost exclusively by batch processes. There are several possible quality advantages of a continuous process over a batch process. Some of the major quality problems of the batch process are as follows:

1. there is too long a period of time between the beginning and end of cellulose addition to the acetylizer because of the difficulty of discharging the fluffy cellulose from the batch pretreater which precedes the acetylizer; further, since the batch acetylizers cannot be completely discharged at the end of a cycle, some cellulose remains in the acetylizer from one batch to another;

2. it is not possible to provide intense agitation uniformly to all portions of the reaching mass in the acetylizer;

3. there are inadvertent differences in process conditions between batch acetylizers in a production line;

4. inadequately pretreated cellulose which remains unreacted at the end of the batch acetylation is usually retained in the finished flake;

5. at temperatures above 75° to 85°C, the residence time between a batch hydrolyzer and flake finishing becomes critical resulting in excessive acetyl value and viscosity degradation and variability.

Gels, lower plugging values and a rather wide dispersion of acetyl value and intrinsic viscosity are the results of the inadequacies in a batch process. A properly designed continuous process offers means of overcoming these inherent quality defects to produce cellulose ester flake having the desired degree of esterification, viscosity and combined sulfates, as well as an extremely high plugging value.

The plugging value is a measure of the relative filterability of a cellulose ester in solution. It is related to filter press life in the plants under operating conditions. A six percent solution of the cellulose ester in a suitable solvent is prepared and filtered through a 30 ply Kimpak and Canton flannel at about 200 pounds per square inch gauge nitrogen pressure until the filter is plugged. The plugging valve is defined as the grams of dry cellulose ester per square centimeter of filter area which can be filtered before blockage occurs.

Cellulose will react under anhydrous conditions, in the presence of a catalyst, with an aliphatic acid anhydride, such as acetic anhydride, to form a cellulose ester according to the following simplified equation:

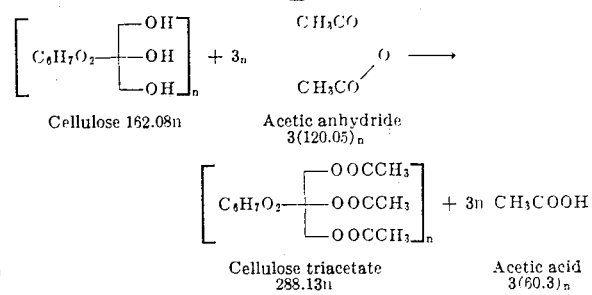

Cellulose 162.08n    Acetic anhydride 3(120.05)n

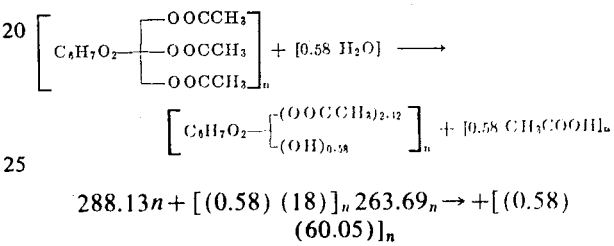

Cellulose triacetate 288.13n    Acetic acid 3(60.3)n

The fully acetylated cellulose acetate contains 44.8 percent combined acetyl or 62.5 percent as combined acetic acid. The cellulose triacetate is then hydrolyzed to give a cellulose acetate which contains approximately 39.42 percent combined acetyl or 55.0 percent, as combined acetic acid according to the following simplified equation:

$$\left[ C_6H_7O_2 \begin{matrix} -OOCCH_3 \\ -OOCCH_3 \\ -OOCCH_3 \end{matrix} \right]_n + [0.58\ H_2O] \longrightarrow$$

$$\left[ C_6H_7O_2 \begin{matrix} -(OOCCH_3)_{2.42} \\ -(OH)_{0.58} \end{matrix} \right]_n + [0.58\ CH_3COOH]_n$$

$$288.13n + [(0.58)(18)]_n\ 263.69_n \rightarrow +[(0.58)(60.05)]_n$$

Specifically, this process is begun by charging acetylation grade cellulose, which has been shredded into small pieces, into an acetylator containing the bulk of the acetic acid and a small amount of catalyst, such as sulfuric acid. The cellulose is slowly agitated at about 100°F. for a period of about one hour or until it is thoroughly activated. Acetic anhydride which was previously cooled is then added, and the mixture is cooled to about 30° to 40°F, which requires about 45 minutes, at which point the balance of the catalyst and a small amount of acetic acid are then added. The anhydride reacts with the water introduced by the cellulose, causing the temperature to rise sharply. The cellulose starts to acetylate, and the temperature is lowered to keep the reaction under control.

As the cellulose progressively reacts, the mass gradually turns from a thin, soupy mass into a heavy, doughy state from which it finally emerges as a clear, viscous honey-like solution. During this period, the temperature is usually allowed to rise to about 110° to 110°F. After 2 hours, the cellulose is almost completely acetylated and the reaction is continued only long enough after the temperature levels off to work out the last remaining fibers and to bring the solution to the desired viscosity. When this has been accomplished, the weak acid which furnishes the water for the hydrolysis is slowly added over about a 45 minute period as the solution is being vigrously agitated. The solution is then brought to about 100°F and discharged into a hydrolysis vessel where it is kept at constant temperature until the desired number of acetyls have been removed. When the desired acetyl content has been reached, the solution is pumped slowly into a vessel along with about 10 to 15 weight percent acetic acid and recovered from a later stage of the operation, in such a ratio that the resulting mixture contains about 25 to 35 weight percent acetic acid.

The mixture is vigorously agitated during this stage and, as a result, the cellulose acetate separates from the solution as a flaky solid. The slurry is dropped continuously into a preliminary washer where the 25 to 35 weight percent acid is drained off and pumped to a recovery system. The solid cellulose acetate is then washed with a controlled amount of water until the acidity is reduced to about 0.1 percent, as acetic acid. The cellulose ester and water slurry is pumped through a final washing tank where it is washed with water until substantially free of acid.

Stabilizing salts, frequently the carbonates or hydroxides of calcium, magnesium or sodium, are then added and the cellulose acetate is pumped in slurry form to a dehydrating machine. Herein the moisture content is reduced to about 50 to 75 weight percent and the flake is afterwards shredded to break up the lumps and conveyed to an air dryer, where it is dried at about 225° to 275°F to less than about 1 weight percent moisture content. It is then conveyed to storage for use in the textile solution-making operation.

In addition to containing acetyl and hydroxyl groups, commercial cellulose acetate contains small amounts of free carboxyl and acid sulfate groups. Acid sulfate groups arise from the use of sulfuric acid as a catalyst for the acetylation reaction. They are substantially removed during hydrolysis, though never entirely, and have a decided influence on the inherent stability of the cellulose acetate, especially to heat and boiling water. The acid groups are of importance because they combine with metallic salts sometimes present in the wash water and cause artificially high viscosity when the cellulose acetate is dissolved in solvents.

Almost any plant that grows contains sufficient cellulose to be utilized as a source of chemical cellulose. Formerly, cellulose utilized for acetylation to produce cellulose esters suitable for forming filaments was obtained chiefly from purified cotton linters, the short cotton fibers cut from the cotton seed after the removal of the long fibers by a cotton gin. More recently, wood pulp having a high alpha-cellulose content has become the dominant raw material. The purified cellulose or wood pulp must be relatively free of hemicelluloses, which are chiefly pentosans and polysaccharides, such as mannans and xylans, which may contribute to serious thixotropy, and free of oxycelluloses, which may form metallic salts that could cause orifice blockage. Alpha-cellulose is a technical term for the portion of wood pulp that is insoluble in alkali of mercerizing strength (17.5 percent). The solution portion comprises the hemicelluloses, polysaccahrides, oxycelluloses and lower molecular weight substances. Wood pulps having an alpha-cellulose content of from about 96 to 98 weight percent are satisfactory materials for this end use.

Aliphatic esters other than cellulose ester are also made. They are made in much the same general manner as the acetate esters except that another acid such as butyric or propionic acid is substituted for all or part of the acetic acid and acetic anhydride.

OBJECTS OF THE INVENTION

It is an object of the present invention to provide a continuous process for the esterification of cellulose which results in a continuously uniform product having a minimum variation in the degree of esterification, uniform viscosity, of high plugging value and low combined sulfates.

It is a further object of this invention to provide a process for the continuous esterification of wood pulp having a lower alpha-cellulose content than was heretofore thought useable and producing flake for the production of cellulose ester filaments.

It is still another object of this invention to provide a continuous process for the production of cellulose secondary acetate flake of superior quality and/or at lower cost due to the utilization of lower cost wood pulp.

It is another object of this invention to provide cellulose ester flake of higher plugging value than was heretofore possible.

Further objects of the present invention will become apparent hereinafter.

SUMMARY OF THE INVENTION

The continuous esterification process of the present invention comprises the following steps:

1. Cellulose is slurried in a lower fatty acid/water slurry containing from about 70 to 95 weight percent lower fatty acid and from about 5 to 30 weight percent water, wherein the lower fatty acid is a $C_1$ to $C_4$ monocarboxylic acid and mixtures thereof.

2. Water is extracted from the cellulose slurry and the cellulose deliquored prior to esterification to prevent excessive anhydride consumption. The slurry is metered to an extractor and washed with from about 2 to 5 pounds of lower fatty acid per pound of cellulose. Residence time in the extractor ranges from about 2 to 10 minutes. Cellulose leaves the extractor and is deliquored to about 30 to 50 weight percent consistency and from about 2 to 5 weight percent water, based on the weight of cellulose.

3. The cellulose is preferably fluffed and a catalyst is blended therein. Any strong mineral acid such as sulfuric, perchloric, nitric or hydrochloric is an effective catalyst. From about 5 to 10 weight percent, based on the weight of the cellulose, of the catalyst is added to the cellulose.

4. Pretreated cellulose containing the lower fatty acid and catalyst is mixed with a lower fatty acid/lower fatty acid anhydride mixture containing about 10 to 30 weight percent excess anhydride. The cellulose mixture is esterified for from about 20 to 50 minutes with a gradually increasing temperature profile ranging from about 14° to 55°C.

5. Esterified drops from the reactors is then injected with magnesium acetate solution and blended with an inline blender to partially neutralize sulfuric acid catalyst and to neutralize all excess anhydride to stop acetylation. Enough magnesium acetate is added to reduce the sulfuric acid catalyst to 1.5 to 4.0 weight percent based on cellulose.

6. The reaction mixture is continuously hydrolyzed in a multi-stage, turbine agitated vessel at approximately 90° to 120°C for 30 to 60 minutes, temperature being fixed by residence time.

7. After hydrolysis, enough magnesium acetate is added in an inline blender to continuously neutralize all the sulfuric acid and catalyst.

8. The dope is then flash cooled to 72°C to stop all reactions.

9. Conventional secondary acetate flake finishing is then used, i.e., the flake is precipitated, washed, dried and stored for use.

After finishing, the continuously esterified flake is solutioned in a suitable solvent preparatory to the spinning operation. The continuously esterified flake of this invention has a higher plugging value than flake that has heretofore been produced, a narrow standard deviation in viscosity and, preferably, a narrow standard deviation in acetyl value. These improved properties result in a more uniform product and improved spinning metier stability.

A high plugging value means better filterability which results in longer filter life and improved stability in the spinning metier.

The continuously esterified flake of this invention has a plugging value of from about 50 to 100 grams per square centimeter, preferably 80 to 100 grams per square centimeter; a standard deviation in viscosity of less than about 8 centipoises, preferably less than about 5 centipoises. Preferably the flake also has a standard deviation in the degree of esterification, expressed as the combined lower fatty acid, of less than about 0.20 percent, preferably less than about 0.15 percent; and a level of acid catalyst salts of less than about 0.03 weight percent, preferably from about 0 to about 0.025 weight percent. The most preferred flake is cellulose acetate, wherein the degree of esterification is expressed as the acetyl value, preferably about 55.0 percent, expressed as combined acetic acid.

The viscosity of a liquid is a measure of its internal friction and if the liquid is a solution of high polymer material, the viscosity is an indication of the molecular weight. It is important that the viscosity of cellulose ester flake be within specified limits to obtain a uniform material for spinning yarn. The 6 percent viscosity of a solution of esterified cellulose flake is measured by timing the flow through a calibrated viscometer of a solution containing about 6 weight percent cellulose ester in a solvent, preferably 95/5 weight percent acetone/water for cellulose acetate.

The sulfate content of cellulose acetate should be controlled at a minimum value because of the effect of these sulfates on the stability, dyeing and extrusion characteristics. The sample is treated with hot 0.07 weight percent hydrochloric acid in a stream autoclave to split off bound sulfate groups. These, together with the soluble sulfate salts, are leached out and determined gravimetrically after precipitation with barium chloride. Results are reported as percent sulfate, $SO_4$, by weight.

DESCRIPTION OF THE PREFERRED EMBODIMENTS

In a preferred embodiment, the continuous esterification process of the present invention comprises the following steps:

1. Cellulose is slurried by hydropulping at about 1.5 to 4.0 weight percent consistency in an acetic acid/water slurry containing from about 70 to 95 weight percent acetic acid and from about 5 to 30 weight percent water. The wood pulp is hydropulped for from about 3 to 20 minutes and discharged into a slurry tank.
2. Water is extracted from the cellulose slurry and the cellulose deliquored prior to acetylation to prevent excessive anhydride consumption. The slurry is then washed with from about 2 to 5 pounds of glacial acetic acid per pound of cellulose. Residence time in the extractor ranges from about 2 to 10 minutes, preferably under a vacuum of from about 1 to 15 inches of mercury. Cellulose leaves the extractor at a consistency of from about 13 to 20 weight percent and contains from about 6 to 12 weight percent water, based on the weight of the cellulose. The cellulose is deliquored to about 30 to 50 weight percent consistency and from 2 to 5 weight percent water, based on the weight of the cellulose, by subjecting the cellulose to a drying procedure, such as by utilizing a centrifuge having a centrifugal force from about 1,200 to 1,800 gravities for from about 1.5 to 7 seconds.
3. The cellulose is preferably fluffed and a catalyst (preferably sulfuric acid) is uniformly blended in. From about 5 to 10 weight percent, based on the weight of the cellulose, of a catalyst, such as sulfuric acid, is preferably added to glacial acetic acid (from about 0.5 to 2 pounds per pound of cellulose). Preferably, this mixture is then blended into the cellulose.
4. Pretreated cellulose containing acetic acid and catalyst is mixed with A-mix (from about 35 to 70 weight percent acetic anhydride and 30 to 65 weight percent acetic acid) which has been preferably precooled to about −10° to 25°C. About 10 to 30 weight percent excess anhydride over that required to acetylate the cellulose is used in the initial startup. Residence time in the acetylizers is from 15 to 50 minutes with a gradually increasing temperature profile ranging from 14° to 55°C, preferably from about 23° to 46°C. Two acetylizers, in series, are preferably used and ideally have from about 15 to 25 theoretical stages to insure uniform residence time history.
5. Acetylated drops from the reactors is then thoroughly and rapidly blended with an aqueous solution of a neutralizing salt, preferably magnesium acetate or zinc acetate. The sulfuric acid concentration is reduced to less than 4 weight percent, preferably from about 1.5 to about 3 weight percent, based on the weight of the cellulose.
6. The partially neutralized acetylated dope is then hydrolyzed and desulfated.
7. Aqueous neutralizing salt, preferably magnesium acetate or zinc acetate, is added to the hydrolyzed dope to stop all reactions. It is often preferred to utilize up to 5 weight percent excess of the neutralizing salt to insure that all the catalyst is neutralized.
8. The dope is then flash cooled to 72°C to stop all reactions. Flashing takes place across a control valve into an evacuated flash tank. The flashing acid at 70 to 80 percent acetic acid concentration can be condensed and recovered by direct distillation thus by-passing solvent extraction and saving on acid recovery costs.
9. Conventional continuous flake finishing is then used for the continuously acetylated dope.

It will be understood by those skilled in the art that other $C_1$–$C_4$ lower fatty acids and anhydrides or other strong mineral acid catalysts can be utilized in the above process with equivalent results.

In a more preferred embodiment, the continuous esterification process of the present invention comprises the following steps:

1. Cellulose is slurried by hydropulping at about 2 to 3 weight percent consistency in an acetic acid/water slurry containing from about 75 to 85 weight percent acetic acid and from 15 to 25 weight percent water. The wood pulp is hydropulped for from about 3 to 7 minutes and discharged into a slurry tank.
2. Water is extracted from the cellulose slurry and the cellulose deliquored prior to acetylation to prevent excessive anhydride consumption. The slurry is metered to an extractor and washed with from about 2 to 3.5 pounds of glacial acetic acid per pound of cellulose. Residence time in the extractor ranges from about 2 to 5 minutes, preferably under a vacuum of from about 5 to 10 inches of mercury. Cellulose leaves the extractor at a consistency of from about 13 to 17 weight percent and contains from about 8 to 11 weight percent water, based on the weight of the cellulose, and is deliquored to about 35 to 45 weight percent consistency and from about 2 to 4 weight percent water, based on the weight of the cellulose, by subjecting the cellulose to a drying procedure, such as by utilizing a centrifuge having a centrifugal force from about 1400 to 1600 gravities for from about 3 to 5 seconds.
3. The cellulose is fluffed and a sulfuric acid catalyst, diluted in glacial acetic acid, is uniformly blended in the second stage pretreater. From about 6 to 8 weight percent, based on the weight of the cellulose, of the catalyst, is added to glacial acetic acid present in an amount from about 0.75 to 1.25 pounds per pound of cellulose.
4. Pretreated cellulose containing acetic acid and catalysts is mixed in the first section of the first acetylizer with A-mix (from about 40 to 60 weight percent acetic anhydride and 40 to 60 weight percent acetic acid) which has been preferably precooled to about 3° to 10°C. Approximately 15 to 25 weight percent excess acetic anhydride over that required to acetylate the cellulose is used in the initial startup. However, excess anhydride can be reached when the operation stabilizes. Residence time in the acetylizers is from about 15 to 35 minutes with a gradually increasing temperature profile ranging from about 23° to 46°C. Two acetylizers, in series, are used and ideally have about 20 theoretical stages to insure uniform residence time history.
5. Acetylated dope from the reactors is then thoroughly and rapidly blended with an aqueous neutralizing salt, preferably magnesium acetate or zinc acetate. The sulfuric acid concentration is reduced to from about 1.5 to about 2 weight percent, based on the weight of the cellulose.
6. The partially neutralized acetylated dope is then hydrolyzed and desulfated for from about 30 to 60 minutes at a temperature of from about 95° to 120°C. Hydrolysis is the reaction between water and combined acetyl groups in the acetylated cellulose. Desulfation is the reaction between water and combined sulfates in the acetylated cellulose. Water is excess and is the driving force. Temperature and sulfuric acid are the catalysts in the reactions which produce cellulose and acetic and sulfuric acid.
7. Aqueous neutralizing salt, preferably magnesium acetate or zinc acetate, is added to the desulfated dope to stop all reactions. About 5 weight percent excess of the neutralizing salt is used to insure that all the catalyst is neutralized.
8. Conventional continuous flake finishing is then used for the continuously acetylated dope.

The continuous esterification process of this invention utilizes:

1. A cellulose pretreatment in a liquid slurry mixture, high water concentration during activation and subsequent controlled extraction of water and some detrimental cellulosic material.
2. The esterification catalyst catalyzes a uniform esterification reaction because: (a) in the continuous process there is substantially no time lag in uniformly blending all of either the catalyst or the esterification mixture into the pretreated cellulose, and (b) temperature control is maintained within narrow limits.
3. In the subsequent steps, e.g., desulfation, hydrolysis and neutralization, there is again substantially no time lag in the addition of the materials as well as good temperature control.
4. Flash cooling to coll the hydrolyzed dope.

In the process of this invention, it is extremely important that the temperature during the various steps of the process be controlled within narrow limits to insure a uniform product. Therefore, while the temperature conditions may be chosen within the ranges previously set forth, the temperature during each process step, once set, must be controlled to within about 3°C of the set temperature or temperature profile, preferably within about 1°C.

The continuous process of this invention allows one to accurately control temperature because there is enough heat transfer area in relation to the volume of the mass whose temperature is being controlled. This is in contrast to a batch-type process where the heat transfer area of the kettle-like reactor is small compared with the volume of the batch.

Thus, the use of plural continuous esterifiers, e.g., 2 acetylizers each having multi-stages, permits accurate control of the temperature profile during esterification, i.e., accurate control at the beginning and end of each stage to within 3°C of the desired temperature. This accurate control is such that any given group of particles in the esterified cellulose flake will have substantially uniform temperature history.

These combined improvements over a batch process result in producing an improved quality flake having about half the viscosity variability and about 3 times the plugging value.

The invention is further illustrated by the following examples. All percentages are by weight and all temperatures are in degrees centigrade, unless otherwise specified.

EXAMPLE I

Wood pulp having an alpha-cellulose content of about 97 weight percent is slurried by hydropulping at about 2.5 percent by weight consistency in 80/20 weight percent acetic acid/water slurry for about 5 minutes and discharged into a slurry tank. Water is removed from the mixture by continuous countercurrent extraction of water from the slurry with glacial acetic acid in a 5-stage extractor. The slurry is countercurrently washed with about 2.9 pound glacial acetic acid per pound of cellulose for about 3 minutes. A vacuum of about 8 inches of mercury is utilized to draw the liquid from the slurry, forming a cellulose cake having about 15 weight percent consistency and about 9.3 weight percent water, based on the weight of the cellulose. The cellulose cake is then deliquored to about 25 weight percent consistency and about 4 weight percent water, based on the weight of the cellulose, by subjecting it to the action of a squeeze roll.

The cellulose is fluffed; 7.1 weight percent, based on the weight of the cellulose, of sulfuric acid is added to one pound of glacial acetic acid per pound of cellulose and mixed with the 25 percent consistency cellulose for about 2 to 3 seconds. This pretreated cellulose is then mixed with a mixture containing about 68 weight percent acetic anhydride and about 32 weight percent acetic acid which had been cooled to about 3°C. About 20 weight percent excess acetic anhydride over that required to fully acetylate and cellulose is used in the startup. The cellulose is acetylated for approximately 30 minutes with a gradually increasing temperature profile from about 23°C to 46°C. The two acetylizers, in series, had approximately 20 theoretical stages which insured substantially uniform residence time history. Acetylated dope from the reactors is rapidly blended with aqueous magnesium acetate (about 21 weight percent solution in water). This reduced the sulfuric acid concentration to about 2 weight percent, based on the weight of the cellulose.

The partially neutralized acetylated dope is hydrolyzed and desulfated in a steam jacketed 30-stage column for about 30 minutes at a temperature of about 115°C, steam being injected in the first 3 stages. An excess of about 5 percent magnesium acetate is added to the dope to insure that all the catalyst is neutralized and to stop all reactions. The mixture is flash cooled to 72°. The dope is then precipitated, washed and dried to yield cellulose acetate flake.

The continuously acetylated flake is found to have an acetyl value of about 55.0 percent, a plugging value of about 55 grams per square centimeter, a viscosity of about 105 centiposes, a moisture content of about 5 weight percent, an acidity of about 0.003 weight percent, and total sulfates of about 0.008 weight percent.

EXAMPLE II

Nitration grade wood pulp having an alpha-cellulose content of about 92 to 93 weight percent is continuously acetylated according to the procedure set forth in Example I.

The continuously acetylated flake is found to have an acetyl value of about 55.0 percent, a plugging value of about 55 grams per square centimeter, a moisture content of about 5 weight percent, an acidity of less than about 0.003 weight percent and total sulfates of about 0.008 weight percent.

EXAMPLE III

Cellulose secondary acetate flake produced by Example I is solutioned in 95/5 weight percent acetone/water and extruded at both 750 meters per minute and 650 meters per minute. The extrusion data and properties of the yarn produced is summarized in the following table:

EXTRUSION PERFORMANCE OF YARN MADE FROM EXAMPLE I

| | Continuous Process Flake Based Yarn (Flake of Example I) | | Batch Flake Based Yarn (Flake of Example III) | |
|---|---|---|---|---|
| | Avg. | N | Avg. | N |
| 75 denier/20 fil 750 m/min: | | | | |
| Denier | 73.2 | 30 | 73.7 | 40 |
| Instron Tenacity, g/d | 1.30 | 30 | 1.28 | 40 |
| Instron Elongation, % | 23.7 | 30 | 22.5 | 40 |
| Shorts, % | 13.9 | 696 | 16.8 | 624 |

The accurate temperature control, especially during acetylation in combination with the lack of time lag of a continuous process results in an extremely uniform product. This uniform, controlled procedure results in an improved product, and perhaps more importantly, enables the production of satisfactory esterified cellulose flake having a plugging value of from about 40 to 60 grams per square centimeter and from heretofore unuseable wood pulp having a low alpha-cellulose content.

Having thus disclosed the invention, What is claimed is:

1. In a continuous process for the preparation of secondary cellulose acetate by hydrolyzing cellulose triacetate to cellulose secondary acetate, the steps comprising blending acid catalyzed cellulose triacetate dope with an aqueous solution of a neutralizing salt to reduce the acid catalyst concentration to less than about 3 weight percent, based on the weight of the cellulose; hydrolyzing and desulfating the dope at 90° to 120 °C. for 30 to 60 minutes; adding an aqueous neutralizing salt to the desulfated dope and then flash cooling the hydrolyzed dope.

2. The process of claim 1 wherein the acid catalyst concentration is reduced to from about 1.5 to 2 percent based on the weight of the cellulose.

3. The process of claim 1 wherein the acid catalyst is sulfuric acid.

4. The process of claim 1 wherein said dope is hydrolyzed and desulfated at temperatures of from 90° to 115° C.

* * * * *